United States Patent
Aoki et al.

(10) Patent No.: US 10,554,742 B2
(45) Date of Patent: Feb. 4, 2020

(54) INFORMATION PROCESSING SYSTEM

(71) Applicant: SONY COMPUTER ENTERTAINMENT INC., Tokyo (JP)

(72) Inventors: Toshimasa Aoki, Tokyo (JP); Tomoki Takaichi, Tokyo (JP); Kosuke Suzuki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 291 days.

(21) Appl. No.: 14/766,429

(22) PCT Filed: Feb. 19, 2013

(86) PCT No.: PCT/JP2013/054023
§ 371 (c)(1),
(2) Date: Aug. 6, 2015

(87) PCT Pub. No.: WO2014/128836
PCT Pub. Date: Aug. 28, 2014

(65) Prior Publication Data
US 2016/0006797 A1 Jan. 7, 2016

(51) Int. Cl.
*H04L 29/08* (2006.01)
*H04L 29/06* (2006.01)

(52) U.S. Cl.
CPC ............ *H04L 67/104* (2013.01); *H04L 67/22* (2013.01); *H04L 67/42* (2013.01)

(58) Field of Classification Search
None
See application file for complete search history.

(56) References Cited

U.S. PATENT DOCUMENTS 8,042,160 B1    10/2011  Boydstun et al.
2003/0008713 A1   1/2003  Ushiro et al.
(Continued)

FOREIGN PATENT DOCUMENTS

CN    101272356 A    9/2008
EP      1262218 A2   12/2002
(Continued)

OTHER PUBLICATIONS

Kazunori Niwata, Social Networking Service Cooperated with Electronic Commerce, The institute of Electronics, Information and Communication Engineers, Proceedings of the 2006 IEICE Communications Society Conference, Sep. 7, 2006, p. 363 cited in the Office Action dated on Aug. 2, 2016 for corresponding JP Application No. 2015-501115.
(Continued)

*Primary Examiner* — Hamza N Algibhah
*Assistant Examiner* — Tony Williams
(74) *Attorney, Agent, or Firm* — HEA Law PLLC

(57) ABSTRACT

Provided is an information processing system capable of controlling a user s own name disclosed to other user in accordance with the relationship with the other user. A user management server stores, for each of a plurality of users, an identification name adapted to identify the user in association with a restricted disclosure name registered by the user and information identifying a user entitled to disclosure to whom the disclosure of the restricted disclosure name is permitted. The user management server receives a request for acquisition of name information of a requested user including information identifying a requesting user from a client device. The user management server transmits the restricted disclosure name of the requested user as a reply to the acquisition request if the requesting user is registered as a user entitled to disclosure of the requested user. If not, the (Continued)

user management server transmits the identification name of the requested user. The client device shows the transmitted name information of the requested user on a display screen.

11 Claims, 8 Drawing Sheets

(56) References Cited

U.S. PATENT DOCUMENTS

| | | | | |
|---|---|---|---|---|
| 2003/0041167 A1* | 2/2003 | French | ................... | H04L 29/06 |
| | | | | 709/238 |
| 2004/0054711 A1* | 3/2004 | Multer | ................ | H04L 67/1095 |
| | | | | 709/201 |
| 2006/0101019 A1* | 5/2006 | Nelson | ................ | G06F 21/6218 |
| 2007/0198656 A1* | 8/2007 | Mazzaferri | ........... | G06F 3/1415 |
| | | | | 709/218 |
| 2008/0209351 A1* | 8/2008 | Macadaan | ............. | G06F 3/0482 |
| | | | | 715/762 |
| 2009/0151006 A1* | 6/2009 | Saeki | ....................... | G06F 21/10 |
| | | | | 726/28 |
| 2010/0211890 A1 | 8/2010 | Cragun et al. | | |
| 2010/0318614 A1* | 12/2010 | Sager | ................... | G06Q 10/107 |
| | | | | 709/206 |
| 2012/0140083 A1* | 6/2012 | Schultz | ............ | H04N 21/42202 |
| | | | | 348/207.1 |
| 2012/0274964 A1* | 11/2012 | Kimura | .............. | H04N 1/00204 |
| | | | | 358/1.13 |
| 2012/0331088 A1* | 12/2012 | O'Hare | ............... | G06F 21/6227 |
| | | | | 709/214 |

FOREIGN PATENT DOCUMENTS

| | | |
|---|---|---|
| EP | 2204764 A1 | 7/2010 |
| JP | 2001-005833 A | 1/2001 |
| JP | 2002-259314 A | 9/2002 |
| JP | 2002-360936 A | 12/2002 |
| JP | 2003-263396 A | 9/2003 |
| JP | 2004-185449 A | 7/2004 |
| JP | 2004-259071 A | 9/2004 |
| JP | 2008-146246 A | 6/2008 |
| JP | 2010-092304 A | 4/2010 |
| JP | 2011-128775 A | 6/2011 |
| JP | 2011242857 | * 12/2011 |
| JP | 2011242857 A | * 12/2011 |

OTHER PUBLICATIONS

Office Action and Partial Translation of the Office Action for Japanese Patent Application No. 2015-501115 dated Aug. 2, 2016.
English Translation of Written Opinion of the International Searching Authority for PCT/JP2013/054023 accompanied with PCT/IB/373 and PCT/IB/338 dated Sep. 3, 2015, acting as concise explanation of previously submitted reference(s).
English Translation of International Search Report for PCT/JP2013/054023 dated Apr. 2, 2013.
European Search Report dated Aug. 25, 2016 for corresponding EP application No. 13875512.9.
Office Action dated Apr. 26, 2017, for corresponding CN Patent Application No. 201380072866.7 and the translation thereof (along with an English abstract of CN 101272356).
European Search Report dated Jan. 22, 2018 for corresponding EP application No. 17193510.9.
Office Action dated Oct. 29, 2018, for corresponding CA Patent Application No. 2,901,734.

* cited by examiner

F I G. 3

| IDENTIFICATION NAME N1 | NAME INFORMATION RESTRICTED DISCLOSURE NAME N2 | PROFILE IMAGE ICON IMAGE I1 | PROFILE IMAGE PHOTOGRAPHIC IMAGE I2 | FRIEND USER | USER ENTITLED TO DISCLOSURE |
|---|---|---|---|---|---|
| USER U1 | Andy | u1.jpg | photo1.jpg | USER U2, USER U3 | USER U3 |
| USER U2 | Kaz | u2.jpg | photo2.jpg | USER U1, USER U3 | — |
| USER U3 | Lisa | u3.jpg | photo3.jpg | USER U1, USER U2, USER U4 | USER U1, USER U4 |
| USER U4 | Robert | u4.jpg | — | USER U3 | USER U3 |

FIG. 9

| IDENTIFICATION NAME N1 | NAME INFORMATION RESTRICTED DISCLOSURE NAME N2 | PROFILE IMAGE ICON IMAGE I1 | PROFILE IMAGE PHOTOGRAPHIC IMAGE I2 | FRIEND USER | USER ENTITLED TO DISCLOSURE | PROGRAM ENTITLED TO DISCLOSURE |
|---|---|---|---|---|---|---|
| USER U1 | Andy | u1.jpg | photo1.jpg | USER U2, USER U3 | USER U3 | ALL |
| USER U2 | Kaz | u2.jpg | photo2.jpg | USER U1, USER U3 | – | OTHER THAN GAMES |
| USER U3 | Lisa | u3.jpg | photo3.jpg | USER U1, USER U2, USER U4 | USER U1, USER U4 | GAME TITLED "A", GAME TITLED "B" |
| USER U4 | Robert | u4.jpg | – | USER U3 | USER U3 | OTHER THAN GAME TITLED "A" |

INFORMATION PROCESSING SYSTEM

CROSS REFERENCE TO RELATED APPLICATIONS

This application is a National Stage of International Application No. PCT/JP2013/054023 filed on Feb. 19, 2013. The contents of the above documents are incorporated herein by reference in their entirety.

TECHNICAL FIELD

The present invention relates to an information processing system for providing online services to a plurality of users, a user management server making up the information processing system, a control method and a control program of the same, and an information storage medium storing the same program.

BACKGROUND ART

Recent years have seen the emergence of social network-based online services that allow a plurality of users to exchange messages and play games together via networks (refer, for example, to Patent Literature 1). Such services permit a user to register other user as a friend, thus making it possible to communicate with the registered friend.

CITATION LIST

Patent Literature

[PTL 1]
JP 2010-092304A

SUMMARY

Technical Problem

In the above services, users registered as friends include individuals having a variety of relationships. For example, an individual who becomes acquainted only via a network and another individual who has been an acquaintance in the real world in the first place may be both registered as friends. In such a case, there are needs for a user to selectively use different names used by other people to identify the user, as when the user is willing to disclose his or her real name to users with whom the user has a tight relationship, but not so to those users with whom the user has a loose relationship.

The present invention has been devised in light of the foregoing, and it is an object of the present invention to provide an information processing system capable of controlling a user's own name disclosed to other user in accordance with the relationship with the other user, a user management server making up the information processing system, a control method and a control program of the same, and an information storage medium storing the program.

Solution to Problem

An information processing system according to the present invention includes a user management server and a plurality of client devices, each used by one of a plurality of users. The user management server includes a user information storage section. The user information storage section stores, for each of the plurality of users, an identification name uniquely identifying the user in association with a restricted disclosure name registered by the user and information identifying, of the plurality of users, a user entitled to disclosure to whom the disclosure of the restricted disclosure name is permitted. Each of the client devices includes an application execution section and a user information request section. The application execution section executes an application program. The user information request section transmits, to the user management server, a request for acquisition of name information of a requested user including information identifying a requesting user who uses the client device in response to an instruction from the application execution section. The user management server further includes a user information request reception section and a user information transmission section. The user information request reception section receives the request for acquisition of name information transmitted from the client device. The user information transmission section transmits the restricted disclosure name of the requested user as a reply to the acquisition request if the requesting user is registered as a user entitled to disclosure of the requested user. The application execution section shows, on a display screen, the name information of the requested user in accordance with the nature of information transmitted from the user information transmission section.

A user management server according to the present invention is connected to a plurality of client devices, each used by one of a plurality of users. The user management server includes a user information storage section, a user information request reception section, and a user information transmission section. The user information storage section stores, for each of the plurality of users, an identification name uniquely identifying the user in association with a restricted disclosure name registered by the user and information identifying, of the plurality of users, a user entitled to disclosure to whom the disclosure of the restricted disclosure name is permitted. The user information request reception section receives, from one of the plurality of client devices, a request for acquisition of name information of a requested user including information identifying a requesting user who uses the client device. The user information transmission section transmits the restricted disclosure name of the requested user as a reply to the acquisition request if the requesting user is registered as a user entitled to disclosure of the requested user.

A user management server control method according to the present invention controls a user management server connected to a plurality of client devices, each used by one of a plurality of users. The control method includes a step of storing in a storage section, for each of the plurality of users, an identification name uniquely identifying the user in association with a restricted disclosure name registered by the user and information identifying, of the plurality of users, a user entitled to disclosure to whom the disclosure of the restricted disclosure name is permitted. The control method includes another step of receiving, from one of the plurality of client devices, a request for acquisition of name information of a requested user including information identifying a requesting user who uses the client device. The control method includes still another step of transmitting the restricted disclosure name of the requested user as a reply to the acquisition request if the requesting user is registered as a user entitled to disclosure of the requested user.

A program according to the present invention allows a computer to function as a user management server connected to a plurality of client devices, each used by one of a plurality of users. The program allows the computer to function as a storing section, a user information request reception section, and a user information transmission section. The storing section stores in a storage section, for each of the plurality of users, an identification name uniquely identifying the user in association with a restricted disclosure name registered by the user and information identifying, of the plurality of users, a user entitled to disclosure to whom the disclosure of the restricted disclosure name is permitted. The user information request reception section receives, from one of the plurality of client devices, a request for acquisition of name information of a requested user including information identifying a requesting user who uses the client device. The user information transmission section transmits the restricted disclosure name of the requested user as a reply to the acquisition request if the requesting user is registered as a user entitled to disclosure of the requested user. If not, the user information transmission section transmits the identification name of the requested user as a reply to the acquisition request. The program is stored in a computer-readable information storage medium.

BRIEF DESCRIPTION OF DRAWINGS

FIG. 3 is a diagram illustrating an example of information stored in a user information storage section.

FIG. 9 is a diagram illustrating another example of information stored in the user information storage section.

DESCRIPTION OF EMBODIMENT

A detailed description will be given below of an embodiment of the present invention based on the accompanying drawings.

Figure 1:
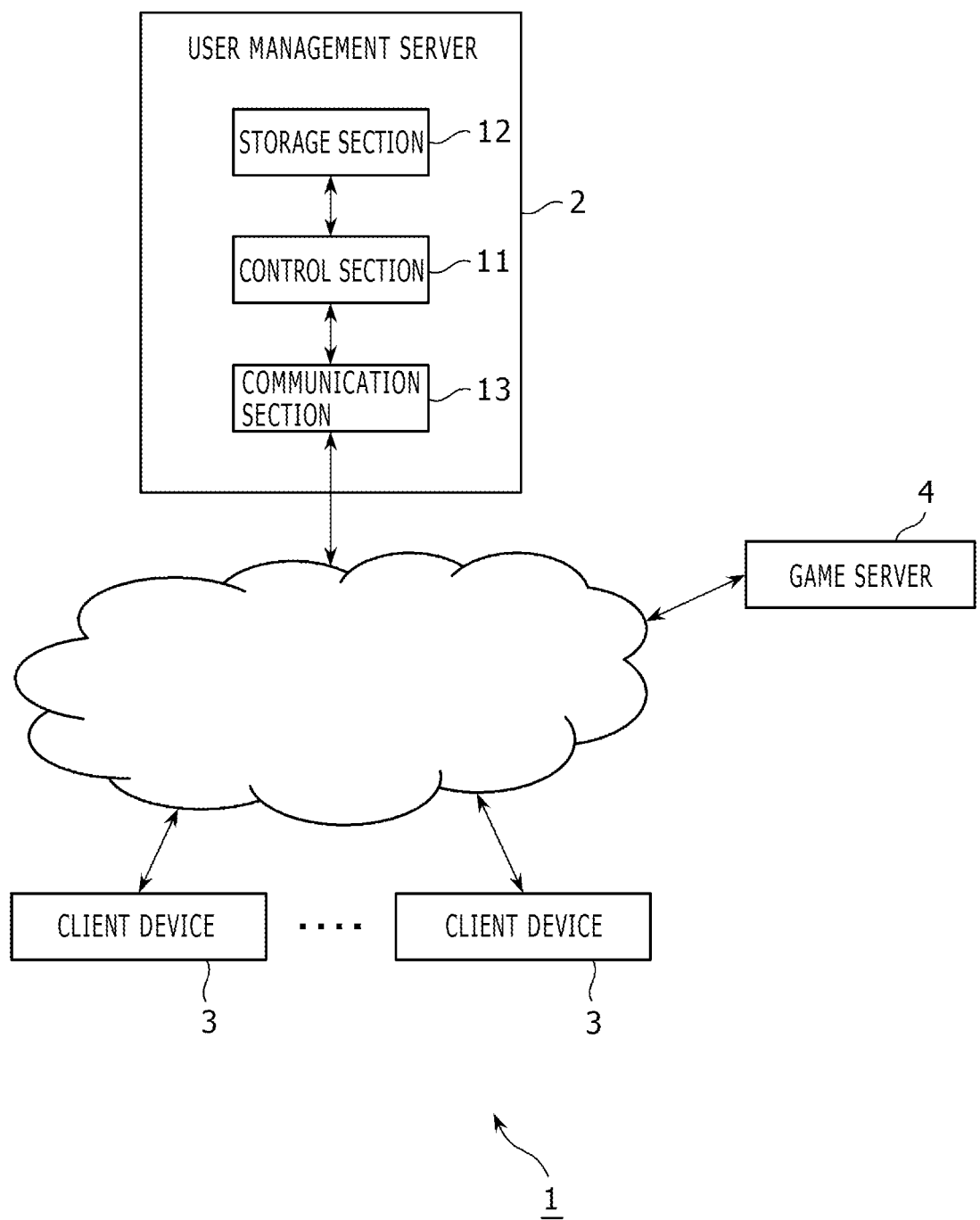
FIG. 1 is an overall configuration diagram of an information processing system according to an embodiment of the present invention.
Figure 2:
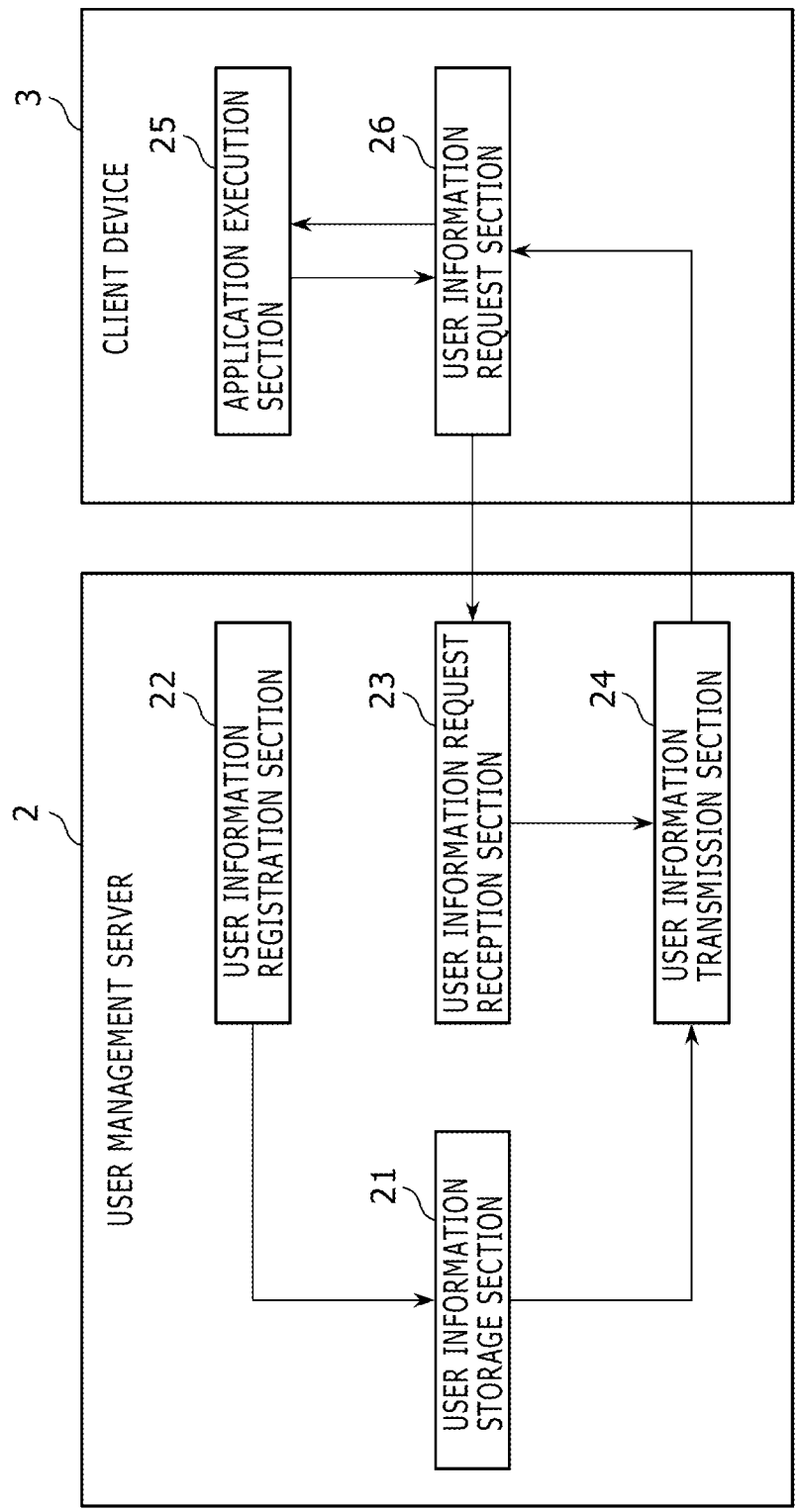
FIG. 2 is a functional block diagram of the information processing system according to the embodiment of the present invention.

FIG. 1 is a configuration diagram of an information processing system 1 according to an embodiment of the present invention. As illustrated in FIG. 1, the information processing system 1 includes a user management server 2, a plurality of client devices 3, and a game server 4. The information processing system 1 provides social network-based online services to a plurality of users. In the present embodiment in particular, the information processing system 1 provides an online game service that allows a plurality of users to join and play games together.

Each of the client devices 3 is a terminal device used by one of users who use the online service implemented by the information processing system 1. Each of the client devices 3 may be, for example, a home or portable game console, a smartphone, or a personal computer. Each of the client devices 3 includes operating devices used by a user to make operation inputs and a display screen adapted to show a variety of information.

The user management server 2 manages information of users who use the online service of the present embodiment. The user management server 2 includes a control section 11, a storage section 12, and a communication section 13 as illustrated in FIG. 1.

The control section 11 is, for example, a CPU and handles a variety of information processing tasks in accordance with the program stored in the storage section 12. A specific example of a process performed by the control section 11 will be described later. The storage section 12 includes memory elements such as RAM and stores the program executed by the control section 11 and data processed by the program. Data stored in the storage section 12 includes information of each user which will be described later.

The communication section 13 is a communication interface such as LAN card. The user management server 2 exchanges data with each of the plurality of client devices 3 and the game server 4 via the communication section 13.

The game server 4 manages information of games provided by the online service of the present embodiment. Alternatively, the game server 4 may handle the processing of the games themselves. The game servers 4 may be made available, one for each of game types provided by the present service, in such a manner as to be independent from each other.

A description will be given below of the functions implemented by the information processing system 1 according to the present embodiment. The information processing system 1 functionally includes a user information storage section 21, a user information registration section 22, a user information request reception section 23, a user information transmission section 24, an application execution section 25, and a user information request section 26. Of these functions, the user information storage section 21 is implemented by the storage section 12 of the user management server 2. The user information registration section 22, the user information request reception section 23, and the user information transmission section 24 are implemented as a result of the control section 11 of the user management server 2 executing the program stored in the storage section 12. This program may be provided to the user management server 2 in a manner stored in one of a variety of information storage media such as optical disc. Alternatively, the program may be provided via a communication network such as the Internet. The application execution section 25 and the user information request section 26 are implemented as a result of each of the client devices 3 executing the program stored in the built-in memory.

The user information storage section 21 stores information of users who use the service of the present embodiment. More specifically, the user information storage section 21 stores, for each of the users, name information, profile image data, and information identifying users registered as friends of the user (hereinafter referred to as friend users). FIG. 3 is a diagram illustrating an example of information stored in the user information storage section 21.

In particular, the user information storage section 21 stores an identification name N1 and a restricted disclosure name N2 as name information of each of the users. The identification name N1 is used by the information processing system 1 to uniquely identify each of the users. The identification names N1 are not allowed to be identical within the system. That is, a user cannot use the same identification name N1 as that currently in use. As a result, he or she may not be able to use a desired name as the identification name N1. With an increasing number of registered users in particular, it tends to become difficult for users who are registered later to use desired names as their identification names N1, causing these users to have to use complicated or long names that are difficult to discern at a glance with human eyes. It should be noted that the disclosure of the identification names N is not particularly restricted and that the identification names N can be referenced by other users.

Unlike the identification names N1, the restricted disclosure names N2 are allowed to be identical, and each user can register a desired name as the restricted disclosure name N2. In the present service, it is assumed that each user registers his or her real name as the restricted disclosure name N2. A user may not wish to disclose his or her real name even to friend users. In the present embodiment, therefore, the disclosure of the restricted disclosure name N2 is restricted, and the referencing thereof is permitted to specific users, a limited number of users of all the friend users (hereinafter referred to as users entitled to disclosure). It should be noted that the user information storage section 21 stores not only information identifying friend users of each of the users but also information identifying which friend users are users entitled to disclosure (refer to FIG. 3).

The user information storage section 21 stores two kinds of profile image data, i.e., a first image such as avatar image (hereinafter referred to as an icon image I1) and a second image registered by the user (hereinafter referred to as a photographic image I2), for each user in association with name information. The icon image I1 is selected by the user from among candidate images made available in advance by the system. There is a likelihood that the icon image I1 may be identical to that of other user. It should be noted that the information processing system 1 may make available, in advance, not the icon image I1 itself but parts of the character (e.g., face, hair, clothing, and background) included in the icon image I1 as options. In this case, each user generates the icon image I1 of his or her own by selecting and combining these parts. Alternatively, the icon image I1 may be uploaded by the user.

On the other hand, it is assumed that the photographic image I2 is image data uploaded and registered by the user and a picture taken of the user himself or herself. Therefore, the photographic image I2 is disclosed only to the users entitled to disclosure as with the restricted disclosure name N2. It should be noted that the icon and photographic images I1 and I2 should preferably be in the same size and format.

The user information registration section 22 receives registration of information stored in the user information storage section 21. More specifically, if the user begins to use the present service for the first time, he or she makes a request for user registration to the user information registration section 22 of the user management server 2 by manipulating the client device 3 of his or her own. At this time, the user enters the identification name N1 of his or her own first and transmits it to the user management server 2. Further, the user also registers the restricted disclosure name N2, the icon image I1, and the photographic image I2 during registration as a new user or at a later arbitrary time. These pieces of information registered by the user are stored in the user information storage section 21.

Further, the user information registration section 22 registers information representing the relationship as friends between users in response to a request from each of the client devices 3. As a specific example, if a user U1 applies to a user U2 for registration as a friend, the client device 3 used by the user U1 transmits a message for application for registration as a friend to the client device 3 of the user U2 in response to an instructing operation by the user U1. When the user U2 makes an operation for approving the registration as a friend in response to the message, information to that effect is notified to the user management server 2. The user information registration section 22 stores, in the user information storage section 21, the fact that the users U1 and U2 have become friends in response to the notification. It should be noted that a message for application for registration as a friend may be exchanged directly between the client devices 3. Alternatively, a message may be transmitted to the destination client device 3 via the user management server 2 or other message relaying server.

Registration as a user entitled to disclosure is conducted in the same manner as for registration as a friend. As a specific example, if the user U1 wishes to become a user entitled to disclosure of the user U2, the client device 3 operated by the user U1 transmits, to the client device 3 of the user U2, a message for application for registration as a user entitled to disclosure. When the user U2 makes an operation for approving the registration, information to that effect is notified to the user management server 2. In response thereto, the user information registration section 22 performs a registration process. This registration process adds the user U2 to the users entitled to disclosure of the user U1 and adds the user U1 to the users entitled to disclosure of the user U2. Note that we assume here that one user is registered as a user entitled to disclosure by other user, and vice versa. That is, if the user U1 becomes a user entitled to disclosure of the user U2, the user U2 also always becomes a user entitled to disclosure of the user U1. However, the present invention is not limited thereto. Instead, one application only allows one user to be registered as a user entitled to disclosure of other user, and another application may be necessary to register the other user as a user entitled to disclosure of the one user. It should be noted that, in the present embodiment, only a user who is already registered as a friend user is allowed to be registered as a user entitled to disclosure as described earlier. Further, a message for application for registration as a user entitled to disclosure may be exchanged directly between the client devices 3 as with a message for application for registration as a friend. Alternatively, a message may be transmitted to the destination client device 3 via the user management server 2 or other message relaying server.

Still further, the user information registration section 22 may acquire, from an external social networking service (hereinafter referred to as an external SNS), profile information including the restricted disclosure name N2 and the photographic image I2 of each user. Some external SNSs have an interface designed to provide information managed by themselves via a communication network such as the Internet. Such an interface allows the user information registration section 22 to acquire information already registered in an external SNS and register that information in the present system as user information without causing each user to bother to register, for example, the photographic image I2. In this case, the user instructs the user information registration section 22 to acquire information from an external SNS by entering authentication information such as the user ID and password of the external SNS. In response, the user information registration section 22 accesses the external SNS, requesting the provision of information whose acquisition has been instructed by the user. In particular, it is possible for the user information registration section 22 to acquire information such as the restricted disclosure name N2 and the photographic image I2 of the user by accessing an external SNS which is premised on the use of its services under a real name.

Further, the user information registration section 22 may acquire user information to be registered as a friend user from an external SNS. In general, users who use the service in the external SNS are already registered as friends of each other. Then, an interface may be available which, if a user permits, provides information of users who are registered as friends of that user. In this case, the user information registration section 22 stores external SNS account information in association with the user identification name N1 of the present system. At the same time, the user information registration section 22 acquires information of users who are registered as friends in the external SNS based on the user's permission. This allows the user information registration section 22, if so permitted by a user, to search for a user who is registered as a friend of the user in the external SNS and who, at the same time, already uses the present service and to register that user as a friend user in the present service.

Figure 4:
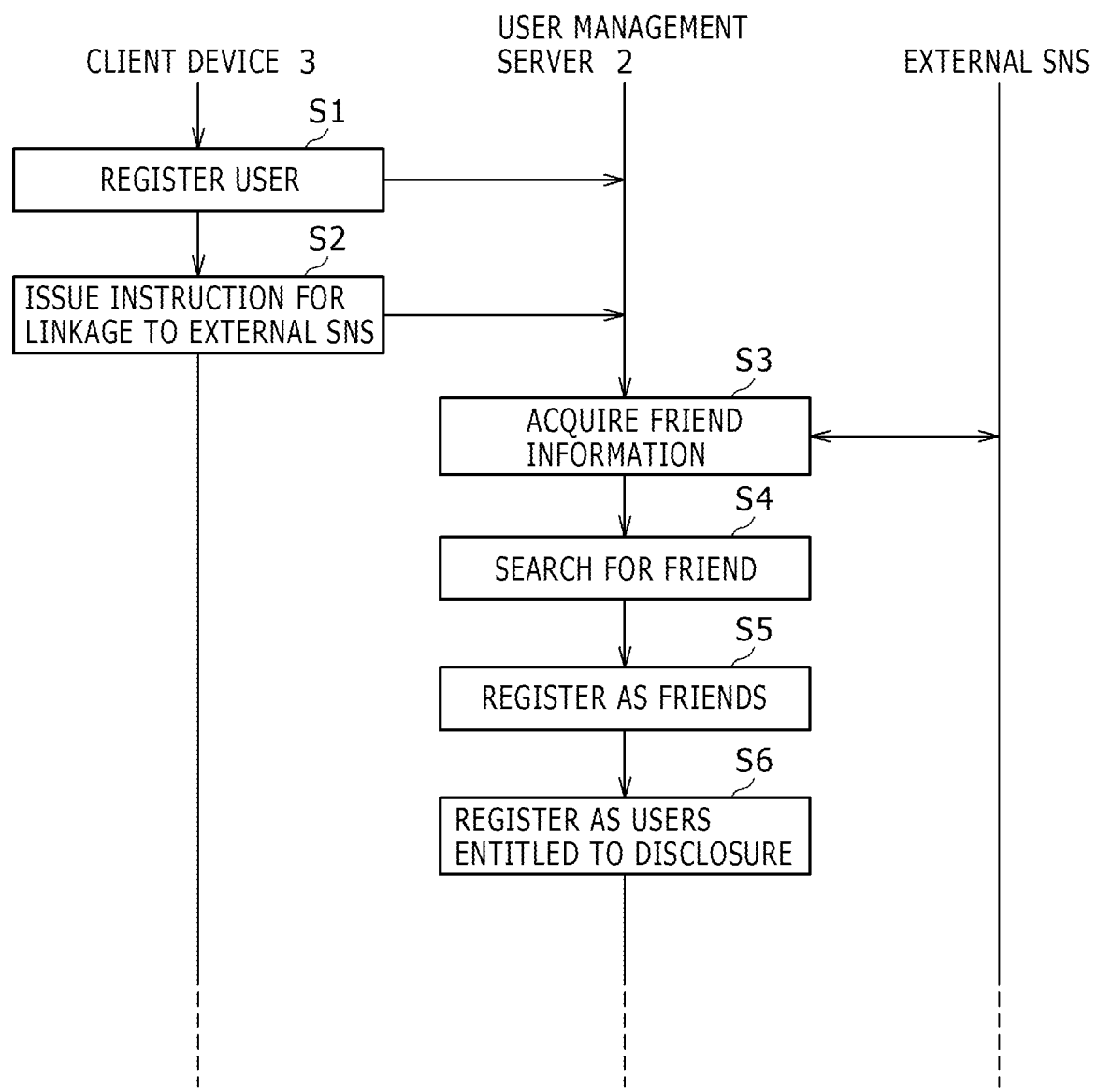
FIG. 4 is a diagram illustrating an example of processing flow during user registration.

A description will be given below of a processing example in this case with reference to the flowchart shown in FIG. 4. In this example, we assume that the users U1 and U2 are registered as friends in an external SNS, and that the user U1 has already linked his or her external SNS account to the account of the present system. Here, we assume that the user U2 registers himself or herself as a user of the present system by manipulating the client device 3 of his or her own (S1). We also assume that the user U2 issues an instruction to acquire information of a user who is registered as a friend in the external SNS by entering external SNS account information (S2). In this case, the user information registration section 22 acquires account information of the users registered as friends of the user U2 by inquiring the external SNS (S3). Such account information includes that of the user U1. Further, the user information registration section 22 makes a search to determine whether or not the acquired external SNS account information is already registered and linked to a user of the present system (S4). Here, external SNS account information of the user U1 is registered. Therefore, the user information registration section 22 extracts the user U1 as a friend of the user U2 and registers the users U1 and U2 as friends in the present service (S5).

Still further, if friend registration is conducted as described above, the user information registration section 22 may automatically register a user, who is registered as a friend based on the inquiry to the external SNS, as a user entitled to disclosure. As described earlier, some external SNSs are premised on the use of their services under a real name. It is probable that users registered as friends of each other in these external SNSs agree to the disclosure of each others' real names and facial photos. Therefore, users who are registered as friends in the present system based on friend information acquired from such a specific external SNS are automatically registered as users entitled to disclosure of each other (S6). This allows for registration as a user entitled to disclosure without users bothering to perform operations such as applying for registration as users entitled to disclosure of each other and approving the application.

The user information request reception section 23 receives a request for provision of user information from the user information request section 26 of each of the client devices 3. Here, a request for provision of user information includes information identifying the transmitting user (hereinafter referred to as the requesting user) and information identifying the user who is requested to provide user information (hereinafter referred to as the requested user). In the present embodiment, the application execution section 25 of each of the client devices 3 executes an application program such as game, showing friend user information during execution. For example, if the users U1 and U2 play an online game together, the client device 3 of the user U1 shows the name and profile image of the user U2 to accompany the character manipulated by the user U2. In order to show such information, the user information request section 26 of the client device 3 used by the user U1 transmits a request for provision of the name and profile image of the user U2 to the user information request reception section 23 in response to an instruction from the application execution section 25.

The user information transmission section 24 transmits information of the requested user to the requesting client device 3 in response to the request for provision of user information received by the user information request reception section 23. At this time, the user information transmission section 24 changes the type of user information to be provided in accordance with the relationship between the requesting and requested users.

More specifically, if the requesting user makes a request to the requested user to provide name information, the user information transmission section 24 determines whether or not the requested user is registered in the user information storage section 21 as a user entitled to disclosure of the requesting user. If so, the user information transmission section 24 transmits the restricted disclosure name N2 in response to the request for provision of name information. If not, on the other hand, the user information request transmission section 24 transmits the identification name N1 in response to the request for provision of name information. This ensures that the restricted disclosure name N2 of the requested user is not disclosed to the requesting user who is not registered as a user entitled to disclosure. The user information transmission section 24 makes a similar determination if the requesting user makes a request to the requested user to provide a profile image. Then, when the requested user is registered as a user entitled to disclosure of the requesting user, the user information transmission section 24 transmits the photographic image I2 in response to the request for provision of a profile image. If not, on the other hand, the user information transmission section 24 transmits the icon image I1 in response to the request for provision of a profile image.

In the present embodiment in particular, we assume that the user information transmission section 24 always transmits either a combination of the identification name N1 and the icon image I1 or a combination of the restricted disclosure name N2 and the photographic image I2, in response to a request for provision of a name and a profile image. Therefore, even if the photographic image I2 of the requested user is not registered, the icon image I1 is not transmitted together with the restricted disclosure name N2 in response to a request for provision of information from a user entitled to disclosure. Such control is conducted for the following reason. That is, it is possible that the restricted disclosure name N2 may be the same as that of other user. The icon image I1 is also generated by combining images or parts made available in advance. Therefore, it is also possible that icon image I1 may be the same as that of other user. Therefore, if the provision of such a combination of a name and an image is permitted, it is likely that a user may easily impersonate other user. In the present embodiment, therefore, user information is provided in the form of one of the above combinations of a name and a profile image. It should be noted that if the user has yet to register the photographic image I2, the user information transmission section 24 transmits a message to the effect that the photographic image I2 does not exist together with the restricted disclosure name N2 in response to a request for provision of information from a user entitled to disclosure. In response, the client device 3 shows a default image Id (e.g., silhouette image) made available in advance rather than the profile image of the requested user.

The application execution section 25 of the client device 3 executes an application program, showing an image representing the execution result on the display screen. In the present embodiment in particular, the application execution section 25 executes an application program such as game or message exchange, showing an image including user information of a friend user (name information and profile image) as an execution result on the display screen. At this time, the application execution section 25 instructs the user information request section 26 to acquire user information to be shown.

The user information request section 26 transmits a request for acquisition of user information to the user information request reception section 23 of the user management server 2 in response to the instruction from the application execution section 25. At this time, the user information request section 26 transmits an acquisition request together with information identifying the user who uses the client device 3 (i.e., requesting user). Then, the user information request section 26 provides the user information, transmitted from the user information transmission section 24 in response to the acquisition request, to the application execution section 25. This allows the application execution section 25 to show an image including either the identification name N1 or the restricted disclosure name N2 provided by the user management server 2 on the display screen.

Figure 5:
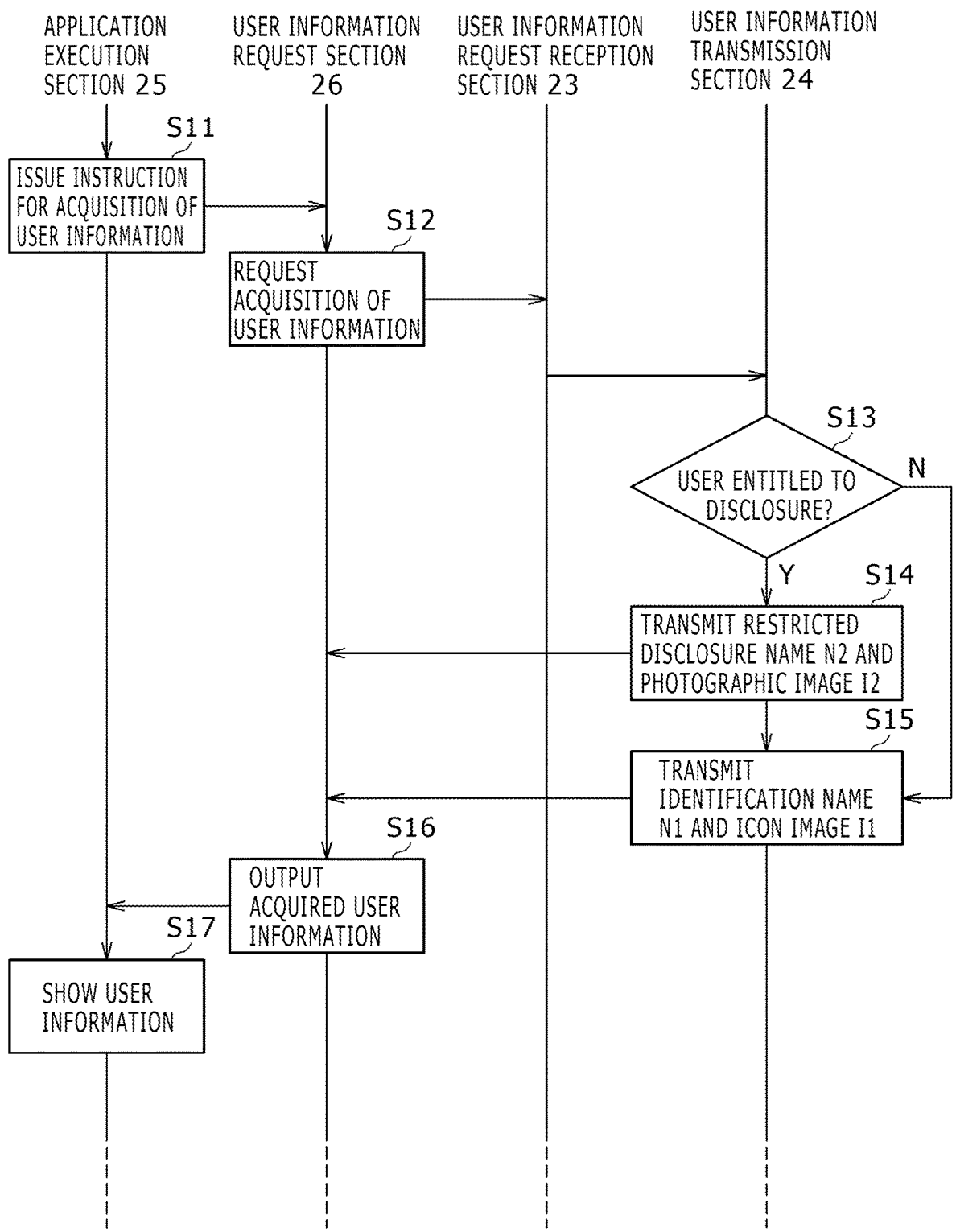
FIG. 5 is a diagram illustrating an example of processing flow for a client device to acquire user information.
Figure 6:
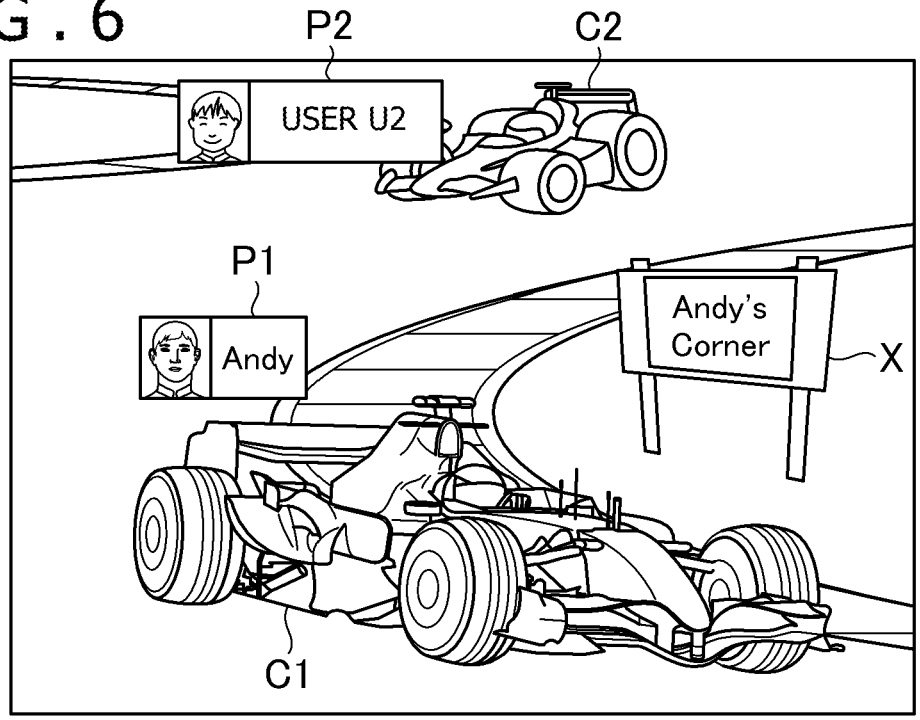
FIG. 6 is a diagram illustrating an example of a game screen shown by the client device.

A description will be given below of a specific example of user information generated and shown by the application execution section 25 of the client device 3 with reference to the flowchart illustrated in FIG. 5 and a display example illustrated in FIG. 6. FIG. 6 illustrates an example of a game image that appears on the display screen of the client device 3 of a user U3. Here, the users U1, U2, and U3 play a racing game together. Racing cars C1 and C2 manipulated respectively by the users U1 and U2 appear in the game image. Further, user information P1 and P2, each including name information and an image of the user manipulating the racing car, is shown respectively for the racing cars C1 and C2. Here, both the users U1 and U2 are friends of the user U3. However, although registered as a user entitled to disclosure of the user U1, the user U3 is not registered as a user entitled to disclosure of the user U2.

In this example, in the client device 3 of the user U3, the application execution section 25 instructs the user information request section 26 to acquire user information of the users U1 and U2 as requested users (S11). In response, the user information request section 26 transmits, to the user information request reception section 23 of the user management server 2, a request for provision of user information together with information identifying the user U3, a requesting user (S12). The provision request specifies the users U1 and U2 as requested users. In response, the user information transmission section 24 determines, for each of the users U1 and U2, requested users, whether or not the user U3 is registered as a user entitled to disclosure (S13). Here, the user U3 is registered only as a user entitled to disclosure of the user U1. Therefore, the user information transmission section 24 transmits the restricted disclosure name N2 and the photographic image I2 of the user U1 in response to the provision request from the user U3 (S14). Conversely, the user U2 has not registered the user U3 as a user entitled to disclosure. Therefore, the user information transmission section 24 transmits the identification name N1 and the icon image I1 of the user U2 (S15). In the client device 3 of the user U3, the user information request section 26 receives the provided user information transmitted from the user information transmission section 24 in S14 and S15, outputting the content of the user information to the application execution section 25 (S16). The application execution section 25 generates a game image including the provided user information, showing the game image on the display screen (S17). It should be noted that the client device 3 is not required to distinguish the name information provided from the user information transmission section 24 as the restricted disclosure name N2 or the identification name N1 and need only show the character string information of the provided name in an 'as-is' fashion on the screen. At the same time, the client device 3 is not required to distinguish the user profile image as the photographic image I2 or the icon image I1 and need only resize the provided image and show it on the screen. As a result, as for the user U1 the disclosure of whose restricted disclosure name N2 and photographic image I2 to the user U3 is permitted, these pieces of information are shown in the game image as illustrated in FIG. 6. This allows the user U3 to know at a glance that the racing car C1 is manipulated by the user U1, his or her acquaintance.

Figure 7:
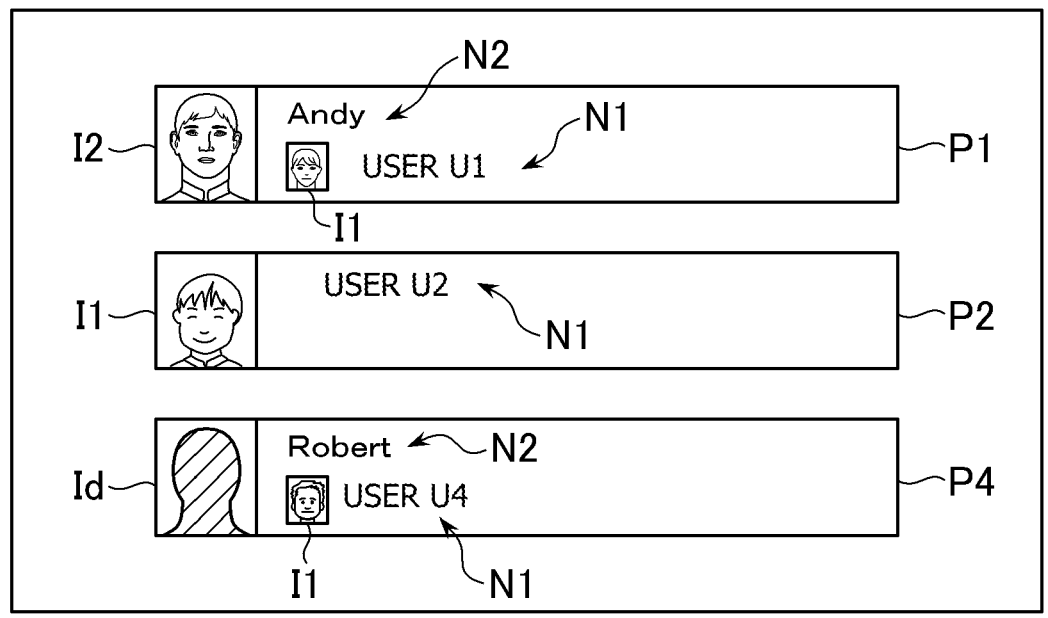
FIG. 7 is a diagram illustrating an example of a friends list shown by the client device.

As another example, FIG. 7 illustrates an example of a friends list display screen. Such a display screen is shown as a result of the application execution section 25 executing the application program that manages the friend users. The example in FIG. 7 illustrates a friends list shown by the client device 3 of the user U3. User information P1, P2, and P4 of the users U1, U2, and U4 is shown one above the other as friends of the user U3. We assume that, of these friend users, the user U3 is a user entitled to disclosure of the users U1 and U4 but is not so of the user U2. As illustrated in FIG. 7, only the identification name N1 and the icon image I1 are shown as the user information P2 for the user U2. On the other hand, not only the identification name N1 and the icon image I1 but also the restricted disclosure name N2 and the photographic image I2 are shown for the user U1. Further, the photographic image I2 of the user U4 is not registered. Therefore, the default image Id is shown where the photographic image I2 should be shown. In the example of FIG. 7 in particular, the identification name N1 of the user U2 and the restricted disclosure names N2 of the users U1 and U4 are shown at positions vertically aligned with each other. Similarly, the icon image I1 of the user U2, the photographic image I2 of the user U1, and the default image Id of the user U4 are shown at the same position and in the same size. Then, the identification names N1 and the icon images I1 of the users U1 and U4 are shown in smaller sizes than the restricted disclosure names N2 and the photographic images I2 thereof in a manner to accompany these names and images. This indicates that the restricted disclosure names N2 and the photographic images I2 are used as information to replace the identification names N1 and the icon images I1 for the users U1 and U4 of whom the user U3 is a user entitled to disclosure.

Further, the user management server 2 may provide user information of a specific user not only to friend users with whom the specific user plays a game but also to an unspecific requesting user. Still further, in such a case, the restricted disclosure name N2 may be provided irrespective of whether or not the requesting user is a user entitled to disclosure of the requested user. The reason for this is that it is likely that name information provided in such a case may not be linked to a specific individual. Alternatively, the user information transmission section 24 may provide part of the restricted disclosure name N2 if a request is made to acquire name information of a requested user from an unspecific requesting user. More specifically, as for the restricted disclosure name N2 made up of first and family names, one of the following may be conducted, namely, providing only the first name, providing only the family name, providing only the initials of the first and family names, and providing a combination of one of the initials of the first and family names and the full name of the other. This makes it possible to provide information about the restricted disclosure name N2 of a specific user in a manner difficult to uniquely identify an individual. A possible example of such control would be giving a special monster or item that appears in a game the name of the user who discovered that monster or item in the game for the first time (discoverer). Such a name serves as a proper noun. Therefore, it is not preferable that the name differs between a user registered as a user entitled to disclosure of the discoverer and a user who is not registered as such. And yet, there may be inconvenience if the entire restricted disclosure name N2 is disclosed to a user who is not registered as a user entitled to disclosure. In such a case, for this reason, only part of the restricted disclosure name N2 is provided.

As an example, if the user U1 discovers a specific monster in a game for the first time, information identifying the user U1 is transmitted to the game server 4. The game server 4 transmits a request for acquisition of name information of the user U1 to the user information request reception section 23 of the user management server 2. If a user information acquisition request is made from the game server 4, the requesting user has yet to be identified. Therefore, the user information transmission section 24 modifies the restricted disclosure name N2 of the requested user (user U1 in this case), transmitting only part thereof to the game server 4 without determining whether or not the requesting user is a user entitled to disclosure. Having acquired information about part of the restricted disclosure name N2, the game server 4 determines the name of the monster discovered by the user U1, transmitting the name to each of the client devices 3. The name includes the acquired part of the restricted disclosure name N2.

Further, another example would be showing information about users who have achieved particular scores in a game on the display screen of each of the client devices 3. As a specific example, we assume that the user U1 has recorded an excellent score at a particular corner of a given course in a racing game. At this time, the name of the user U1 is shown in relation to this corner (X in FIG. 6). In this case, the client device 3 used by the user entitled to disclosure of the user U1 may show the restricted disclosure name N2 of the user U1, with the identification name N1 of the user U1 shown on the client devices 3 used by the other users rather than the restricted disclosure name N2 thereof. In order to achieve such control, information to be shown at the corner identifying the user (identification name N1 of the user) is held by the game server 4. Then, the application execution section 25 of each of the client devices 3 inquires the game server 4 first about information identifying the user to be shown and acquires such information if the corner is shown in the game image. Then, the application execution section 25 instructs the user information request section 26 to acquire name information of the identified user as described earlier. Then, the application execution section 25 shows either the identification name N1 or the restricted disclosure name N2, acquired in response to the instruction, at the corner.

Figure 8:
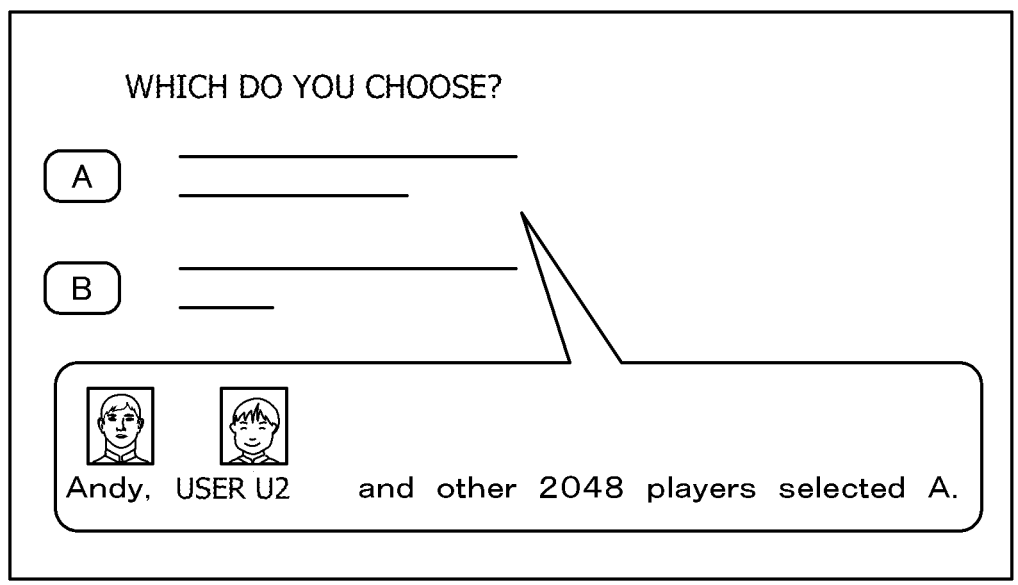
FIG. 8 is a diagram illustrating another example of a game screen shown by the client device.

Further, when executing a game application program in which a story progresses as a result of the user selecting one of a plurality of options as in an adventure game, the application execution section 25 of the client device 3 may show information about the options selected by the friend users of the user who uses the client device 3 on the game screen. FIG. 8 illustrates an example of a game screen in this case. In the example of FIG. 8, a screen appears to prompt the user to select an option A or B. This screen shows not only information about how many users have selected the option A of the two available options but also name information and the profile images of the friend users included thereamong. In this case, the application execution section 25 acquires and shows the restricted disclosure names N2 and the photographic images I2 of the friend users if the user of the client device 3 is a user entitled to disclosure of the friend users. If not, the application execution section 25 acquires and shows the identification name N1 and the icon image I1.

Further, the user information transmission section 24 may switch between name information and profile images to be provided in accordance with not only whether or not a requesting user is a user entitled to disclosure of a requested user but also the application program executed by the requesting application execution section 25. As a specific example, in a particular type of game such as online head-to-head FPS (First Person Shooting) game, for example, one may attack or be attacked by a game character manipulated by other user, an opponent. In such a case, it is probable that some users may not hope that his or her real name and facial photo appear together with his or her game character that appears on the display screen of the opponent. For this reason, each user can specify not only users but also application programs to whom his or her restricted disclosure name N2 and photographic image I2 will be disclosed.

FIG. 9 is a diagram illustrating another example of information stored in the user information storage section 21 in this case. The example of FIG. 9 differs from the example of FIG. 3 in that information about programs entitled to disclosure is further stored in association with each user. Among methods used to specify a programs entitled to disclosure are specifying one for each application program type (e.g., whole of game programs, or a particular genre of game programs) and specifying one for each program (e.g., for each game title). For example, each user may restrict the disclosure of the restricted disclosure name N2 and the photographic image I2 to all the game programs. In FIG. 9, the user U2 specifies such a setting. In this case, the restricted disclosure name N2 and the photographic image I2 are disclosed to the destination party in a friends list and a message exchange application. However, these pieces of information are not disclosed in games. Instead, the identification name N1 and the icon image I1 are shown. Further, each user may restrict or permit the disclosure for each game title. In FIG. 9, the user U3 permits the disclosure to two game titles, namely, games titled "A" and "B" and restricts the disclosure to all other application programs. Conversely, the user U4 restricts the disclosure only to the game titled "A" and permits the disclosure to all other application programs. Alternatively, each user may restrict or permit the disclosure to game programs that belong to a particular genre (e.g., FPS).

In order to achieve such control, if the user information request section 26 of the client device 3 receives an instruction to acquire user information from the application execution section 25, the user information request section 26 transmits, to the user management server 2, a request for acquisition of user information including information about the application program which made the acquisition instruction. Here, information about the application program may include the application program title and information identifying the application program type (e.g., game program, system program). When the user information request reception section 23 receives this acquisition request, the user information transmission section 24 determines first, based on the relationship between the requesting and requested users, whether or not the requesting user is a user entitled to disclosure of the requested user as described above. If the requesting user is not a user entitled to disclosure of the requested user, the user information transmission section 24 transmits the identification name N1 and the icon image I1 to the requesting client device 3. On the other hand, when the requesting user is a user entitled to disclosure of the requested user, the user information transmission section 24 compares information about the application program included in the acquisition request against the information about programs entitled to disclosure given in FIG. 9, determining whether or not the application program which made the acquisition request is a program entitled to disclosure. When, as a result of the determination, the application program is entitled to disclosure, the user information transmission section 24 transmits the restricted disclosure name N2 and the photographic image I2 as requested user information. On the other hand, if the application program is not entitled to disclosure, the user information transmission section 24 transmits the identification name N1 and the icon image I1 as requested user information as is done when the requested user is not a user entitled to disclosure.

Further, in the present embodiment, the client device 3 may include a function to manage whether or not the application execution section 25 is showing information whose disclosure is restricted (restricted disclosure name N2 and the photographic image I2) on the display screen. In recent years, it has become more common to record and disclose, for example, game screens shown on the display screen of the client device 3, in the form of still images or movies. This results in a risk that the restricted disclosure name N2 and the photographic image I2 intended to be disclosed only to specific users entitled to disclosure may be disclosed to unspecific third parties. In the present embodiment, for this reason, when transmitting user information to the client device 3, the user information transmission section 24 of the user management server 2 may include flag information indicating whether or not the disclosure of the user information is restricted. When the application execution section 25 records an on-screen image, the nature of the recording process may be controlled in accordance with the content of the flag information. As a specific example, if the application execution section 25 is showing user information whose disclosure is restricted, the client device 3 may be able to restrict the operation of the program so as to prevent recording of a still image (screenshot) or movie of the display screen. Alternatively, a warning message may be output to the user at the time of recording. Still alternatively, if an image of the display screen is recorded while user information whose disclosure is restricted is shown, the client device 3 may attach, to the recorded image, flag information indicating that user information whose disclosure is restricted is included in the recorded image. This makes it possible to later search for and extract images including user information whose disclosure is restricted from among a number of images so as to delete these images or restrict the disclosure thereof.

It should be noted that the present invention is not limited to the embodiment described above. For example, although, in the description given above, only name information and a profile image are provided by the user management server 2, other different kinds of profile information may be provided in accordance with whether or not the requesting user is a user entitled to disclosure of the requested user. Further, the application program adapted to show user information on the client device 3 is not limited to a game or message exchange application and may be one of a variety of other application programs.

Further, although, in the above description, each of the client devices 3 transmits a request for acquisition of user information directly to the user management server 2, such a request may be transmitted to the user management server 2 via the game server 3. Alternatively, although, in the above description, the user information transmission section 24 of the user management server 2 transmits either the identification name N1 or the restricted disclosure name N2 of a requested user in response to a request for acquisition of name information, the identification name N1 need not necessarily be transmitted. The reason for this is that, in the embodiment described above, the identification name N1 is information used to identify the user and, therefore, is known to the client device 3 attempting to acquire name information of the requested user. In this case, the user information transmission section 24 determines whether or not the requesting user is a user entitled to disclosure of the requested user and transmits the restricted disclosure name N2 of the requested user only when it is determined that the requesting user is a user entitled to disclosure. Then, if the requesting user is not a user entitled to disclosure of the requested user, the user information transmission section 24 transmits information to that effect (i.e., information indicating that the restricted disclosure name N2 cannot be transmitted) to the requesting client device 3 rather than name information. In response to this message, the user information request section 26 of the requesting client device 3 outputs, to the application execution section 25, the identification name N1 of the requested user included in the acquisition request at the time of transmission of the acquisition request as name information of the requested user. Also in this case, the application execution section 25 can show the restricted disclosure name N2 on the display screen when the requesting user is a user entitled to disclosure of the requested user, and show the identification name N1 rather than the restricted disclosure name N2 as user name information if the requesting user is not a user entitled to disclosure of the requested user.

The invention claimed is:

1. An information processing system comprising:
a user management server; and
a plurality of client devices, each being configured to be used by one of a plurality of users;
the user management server comprising:
a user information storage section adapted to store, for each of the plurality of users, (i) an identification name uniquely identifying the user, (ii) a restricted disclosure name registered by the user, the restricted disclosure name being different from the identification name and disclosure of the restricted disclosure name being limited to a user entitled to the disclosure of the restricted disclosure name, (iii) information identifying, of the plurality of users, the user entitled to the disclosure of the restricted disclosure name, the restricted disclosure name and the information identifying the user being stored in association with the identification name, and (iv) a first image and a second image which is registered by the user, as profile images representing the user;

each of the plurality of client devices comprising:
- an application execution section adapted to execute an application program,
- a user identification registration section adapted to transmit, to the user management server, the identification name and the restricted disclosure name registered by the user into the information processing system, and
- a user information request section adapted to transmit, to the user management server, a request for acquisition of name information of a requested user including information identifying a requesting user who uses the client device in response to an instruction from the application execution section;

the user management server further comprising:
- a user information request reception section adapted to receive the request for acquisition of name information transmitted from the client device, and
- a user information transmission section adapted to transmit the restricted disclosure name of the requested user as a reply to the acquisition request if the requesting user is registered as a user entitled to disclosure of the requested user; and the application execution section showing, on a display screen, the name information of the requested user in accordance with the reply transmitted from the user information transmission section, wherein the user information request section transmits a request for acquisition of a profile image of the requested user together with a request for acquisition of name information of the requested user, and the user information transmission section of the user management server (i) transmits the second image together with the restricted disclosure name of the requested user as a reply to the acquisition request if the requesting user is registered as a user entitled to disclosure of the requested user, and (ii) transmits the first image together with the identification name of the requested user as the reply to the acquisition request if the requesting user is not registered as the user entitled to disclosure of the requested user.

2. The information processing system of claim 1, wherein the user information storage section stores information identifying a program entitled to disclosure, to which the restricted disclosure name of the user is disclosed, in association with each of the plurality of users, the acquisition request further includes information about the application program which instructed that the acquisition request be made, and the user information transmission section determines whether or not the application program which instructed that the acquisition request be made is a program entitled to disclosure associated with the requested user, and transmits the restricted disclosure name if it is determined that the application program is a program entitled to disclosure.

3. The information processing system of claim 2, wherein the user information storage section stores information specifying the type of the program entitled to disclosure as information identifying the program entitled to disclosure, the acquisition request includes information specifying the type of the application program as information about the application program, and the user information transmission section determines whether or not the type of the application program included in the acquisition request matches the type of the program entitled to disclosure.

4. The information processing system of claim 2, wherein the user information storage section stores information specifying one or a plurality of programs as information identifying the program entitled to disclosure, the acquisition request includes information specifying the application program as information about the application program, and the user information transmission section determines whether or not the application program included in the acquisition request matches the one or the plurality of programs.

5. The information processing system of claim 1, wherein the user management server further comprising:

a registration reception section of users entitled to disclosure adapted to receive a request for registration of users entitled to disclosure specifying first and second users from the first or second user and store, in the user information storage section, information identifying the second user as the user entitled to disclosure of the first user and information identifying the first user as the user entitled to disclosure of the second user.

6. The information processing system of claim 1, wherein the user information transmission section is adapted to transmit i) the restricted disclosure name of the requested user as the reply to the acquisition request if the requesting user is registered as the user entitled to the disclosure of the requested user, and ii) the identification name of the requested user as the reply to the acquisition request if the requesting user is not registered as the user entitled to the disclosure of the requested user; and the application execution section shows, on the display screen, the name information of the requested user in accordance with the reply transmitted from the user information transmission section.

7. The information processing system of claim 1, wherein the first image is selected by each of the plurality of users from among a plurality of images which are prepared by the information processing system.

8. The information processing system of claim 1, wherein two identification names are not allowed to be identical in the information processing system, and an identical restricted disclosure name is allowed to be registered by two or more users.

9. A user management server connected to a plurality of client devices, each being configured to be used by one of a plurality of users, the user management server comprising:

a user information storage section adapted to store, for each of the plurality of users, (i) an identification name uniquely identifying the user, (ii) a restricted disclosure name registered by the user, the restricted disclosure name being different from the identification name and disclosure of the restricted disclosure name being limited to a user entitled to the disclosure of the restricted disclosure name, (iii) information identifying, of the plurality of users, the user entitled to the disclosure of the restricted disclosure name, the restricted disclosure name and the information identifying the user being stored in association with the identification name, and (iv) a first image and a second image which is registered by the user, as profile images representing the user;

a user information request reception section that receives, from one of the plurality of client devices, a request for acquisition of a profile image of the requested user together with a request for acquisition of name information of a requested user including information identifying a requesting user who uses the client device; and a user information transmission section that i) transmits the second image together with the restricted disclosure name of the requested user as a reply to the acquisition request if the requesting user is registered as a user entitled to disclosure of the requested user, and ii) transmits the first image together with the identification name of the requested user as the reply to the acquisition request if the requesting user is not registered as the user entitled to disclosure of the requested user, wherein each of the plurality of client devices comprises a user identification registration section adapted to transmit, to the user management server, the identification name and the restricted disclosure name registered by the user into the information processing system.

10. A method for controlling a user management server connected to a plurality of client devices, each being configured to be used by one of a plurality of users, the control method comprising:

storing in a storage section, for each of the plurality of users, (i) an identification name uniquely identifying the user (ii) a restricted disclosure name registered by the user, the restricted disclosure name being different from the identification name and disclosure of the restricted disclosure name being limited to a user entitled to the disclosure of the restricted disclosure name, (iii) information identifying, of the plurality of users, the user entitled to the disclosure of the restricted disclosure name, the restricted disclosure name and the information identifying the user being stored in association with the identification name, and (iv) a first image and a second image which is registered by the user, as profile images representing the user;

receiving, from one of the plurality of client devices, a request for acquisition of a profile image of the requested user together with a request for acquisition of name information of a requested user including information identifying a requesting user who uses the client device; and transmitting the second image together with the restricted disclosure name of the requested user as a reply to the acquisition request if the requesting user is registered as a user entitled to disclosure of the requested user, and transmitting the first image together with the identification name of the requested user as the reply to the acquisition request if the requesting user is not registered as the user entitled to disclosure of the requested user, wherein each of the plurality of client devices comprises a user identification registration section adapted to transmit, to the user management server, the identification name and the restricted disclosure name registered by the user into the information processing system.

11. A non-transitory computer-readable information storage medium storing a program for controlling a user management server connected to a plurality of client devices, each being configured to be used by one of a plurality of users, the program comprising instructions for:

storing in a storage section, for each of the plurality of users, (i) an identification name uniquely identifying the user, (ii) a restricted disclosure name registered by the user, the restricted disclosure name being different from the identification name and disclosure of the restricted disclosure name being limited to a user entitled to the disclosure of the restricted disclosure name, (iii) information identifying, of the plurality of users, the user entitled to the disclosure of the restricted disclosure name, the restricted disclosure name and the information identifying the user being stored in association with the identification name, and (iv) a first image and a second image which is registered by the user, as profile images representing the user;

receiving, from one of the plurality of client devices, a request for acquisition of a profile image of the requested user together with a request for acquisition of name information of a requested user including information identifying a requesting user who uses the client device; and transmitting the second image together with the restricted disclosure name of the requested user as a reply to the acquisition request if the requesting user is registered as a user entitled to disclosure of the requested user, and transmitting the first image together with the identification name of the requested user as the reply to the acquisition request if the requesting user is not registered as the user entitled to disclosure of the requested user, wherein each of the plurality of client devices comprises a user identification registration section adapted to transmit, to the user management server, the identification name and the restricted disclosure name registered by the user into the information processing system.

* * * * *